United States Patent [19]
Calder et al.

[11] Patent Number: 6,146,169
[45] Date of Patent: Nov. 14, 2000

[54] WATER RESISTANT OUTDOOR BUSWAY SYSTEM

[75] Inventors: William H. Calder, Plainville; Gary Douville, East Hartford; Andre M'Sadoques; Joseph Nagy, both of Southington, all of Conn.

[73] Assignee: General Electric Company, Schenectady, N.Y.

[21] Appl. No.: 09/288,444

[22] Filed: Apr. 8, 1999

[51] Int. Cl.[7] ....................................... H01R 4/60
[52] U.S. Cl. ................................ 439/213; 439/210
[58] Field of Search ................... 439/213, 210, 439/212, 114; 174/16.2, 68.2

[56] References Cited

U.S. PATENT DOCUMENTS

| | | | |
|---|---|---|---|
| 3,878,312 | 4/1975 | Bergh et al. | 174/9 F |
| 4,804,804 | 2/1989 | Hibbert et al. | 174/16.2 |
| 4,842,533 | 6/1989 | Beberman et al. | 439/213 |
| 4,950,841 | 8/1990 | Walker et al. | |

*Primary Examiner*—Lincoln Donovan
*Assistant Examiner*—Chandrika Prasad
*Attorney, Agent, or Firm*—Cantor Colburn LLP; Carl B. Horton

[57] ABSTRACT

Electrical power distribution busway joints include opposing plates of conductive and non-conductive materials for connecting between adjoining busway sections. The non-conductive plates comprise glass-filled epoxy laminate sheets having high thermal conductivity, high electrical resistance and good mechanical strength in the presence of excess moisture.

1 Claim, 3 Drawing Sheets

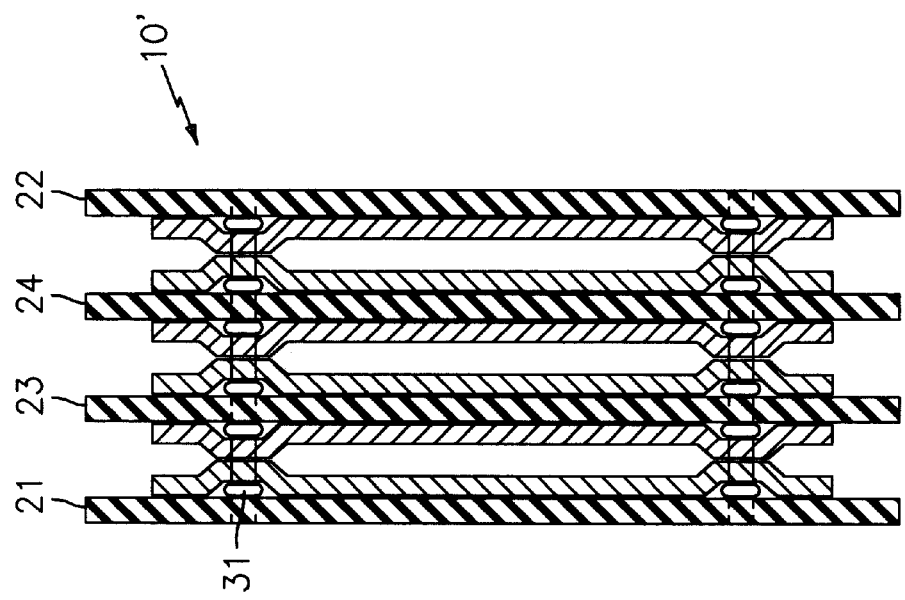
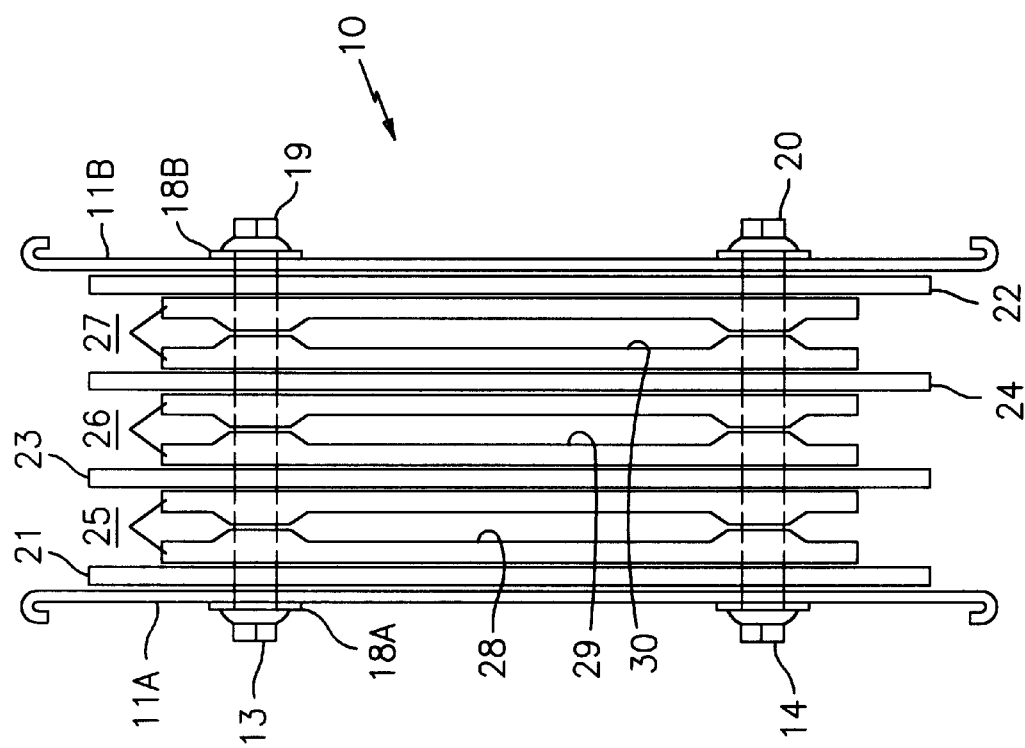

WATER RESISTANT OUTDOOR BUSWAY SYSTEM

BACKGROUND OF THE INVENTION

This invention relates to busway systems, and more particularly, to water resistant outdoor busway systems.

The use of electric power busway is described within U.S. Pat. No. 4,804,804 entitled "Thermally Efficient Power Busway System" for carrying high ampere current within an industrial electrical power distribution system. The busway is in the form of a plurality of copper current-carrying bars, one per each current phase and carrying an insulative coating to prevent inter-phasal transfer.

Electrical connection between separate sections of the power busway is achieved by means of busway joints consisting of copper plates separated by means of a plurality of fiber or glass-filled polyester spacers. Examples of such thermally-efficient busway joints are described within U.S. Pat. Nos. 4,842,533 and 4,950,841 both entitled "Thermally Efficient Splice Joint for Electrical Distribution Busway".

When such busway systems are exposed to the environment, the polyester spacers are of sufficient thickness to insure adequate electrical insulative properties in the presence of condensed moisture conditions. The thickness requirement for outdoor busway joints improves the electrical resistance properties of the spacers while, at the same time, reducing the thermal transport of the heat generated within the copper plates.

The purpose of this invention is to provide electrical busway joint connectors having both electrical insulative as well as thermally conductive properties not influenced by the presence of excessive moisture.

SUMMARY OF THE INVENTION

Electrical power distribution busway joints include opposing plates of conductive and non-conductive materials for connecting between adjoining busway sections. The non-conductive plates comprise glass-filled epoxy laminate sheets having high thermal conductivity, high electrical resistance and good mechanical strength in the presence of excess moisture. The glass is in the form of extended fibers exhibiting improved mechanical strength.

BRIEF DESCRIPTION OF THE DRAWINGS

FIG. 2 is side view of the interior of the busway joint of FIG. 1;

FIG. 3 is a side sectional view of the busway joint of FIG. 2; and

DESCRIPTION OF THE PREFERRED EMBODIMENT

Figure 1:
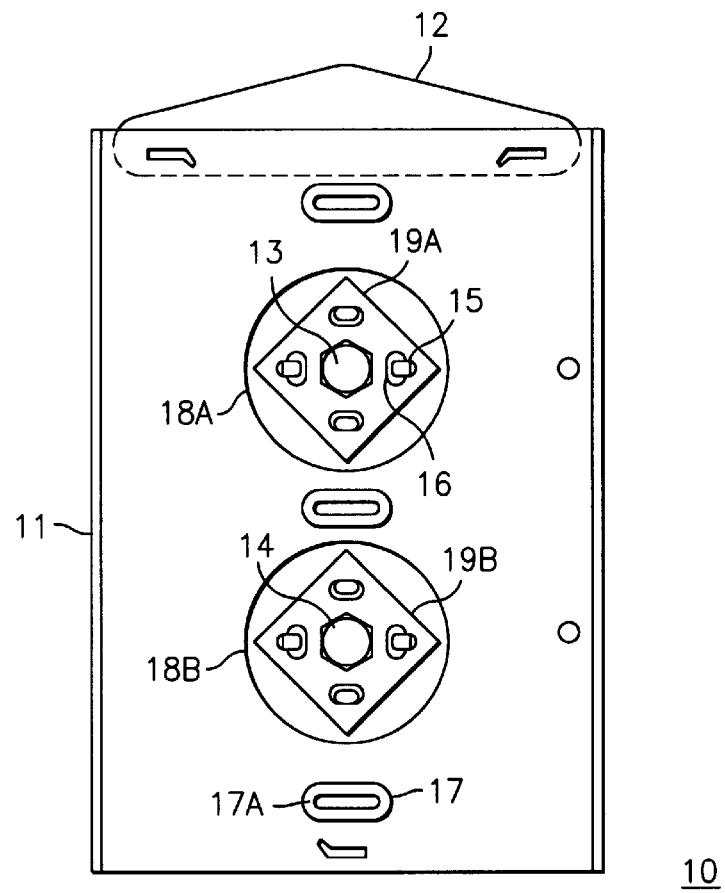
FIG. 1 is an end view of the electrical busway joint according to the invention.

A three-phase busway connector joint 10 is shown in FIGS. 1 and 2 to consist of a pair of outer housing plates 11A and 11B carried by a support strap 12. The connector joint includes successive apertured metal splice plates 25, 26, 27 with corresponding apertured inner insulative plates 23, 24 for insulating between the splice plates as well as corresponding apertured outer insulative plates 21, 22 for insulating between the splice plates and the outer housing plates 11A, 11B. As described within aforementioned U.S. Pat. No. 4,842,533 slotted openings 28, 29, 30 are defined between the metal splice plates 25, 26, 27 to accept the respective ends of the busway system busbars (not shown) for connecting therebetween. Anti-turn insulating tubes 17 of oval cross-section are inserted within corresponding oval-shaped openings 17A formed through the outer housing plates 11A and 11B. Prevention of turning is also provided by the anti-turn lugs, one of which is shown at 15, which cooperate with slotted openings 16 formed in the rectangular washers 19A, 19B respectively. Belleville washers 18A, 18B are arranged on the outer surface of both of the outer housing plates to provide added compressive force to the outer plates when attached together by means of cylindrical bolts 13,14 and corresponding nuts 19,20 respectively. Although means are depicted for only three bus conductors herein, additional bus conductors such as neutral and ground conductors are usually employed, thereby requiring additional pairs of splice plates 25, 26, 27 and insulative plates 21,22,23,24.

In accordance with the invention, it has been determined that the use of glass filled polyester for the insulative plates must be of sufficient weight and thickness to comply with rigid industry electrical resistivity tests within high humidity enclosures. The thickness of the insulative plates increases the overall size of the joint, especially within 3 phase-4 wire; internally grounded industrial electrical distribution systems.

Figure 5:
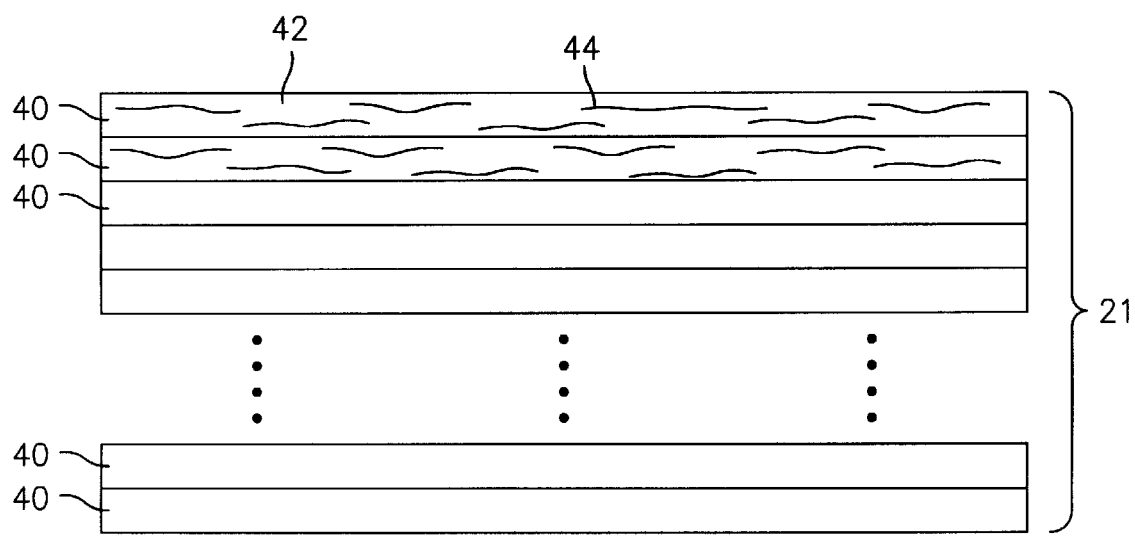
FIG. 5 is a partial side view of an insulative plate of the present invention.

To substantially reduce the overall size and cost of the joints the insulative plates, for example insulative plate 21 as shown in FIG. 5, are now fabricated from a glass-filled epoxy composition, such as a type NP510 obtained from Norplex Inc. wherein the glass was arranged as extended glass fibers 44 embedded in the epoxy 42 in the form of thin laminates 40, and the composite laminates were then arranged in a plurality of layers. The optimum electrical resistance and mechanical strength properties were obtained within the range of about 75–160 layers per inch of the composite laminates.

Figure 4:
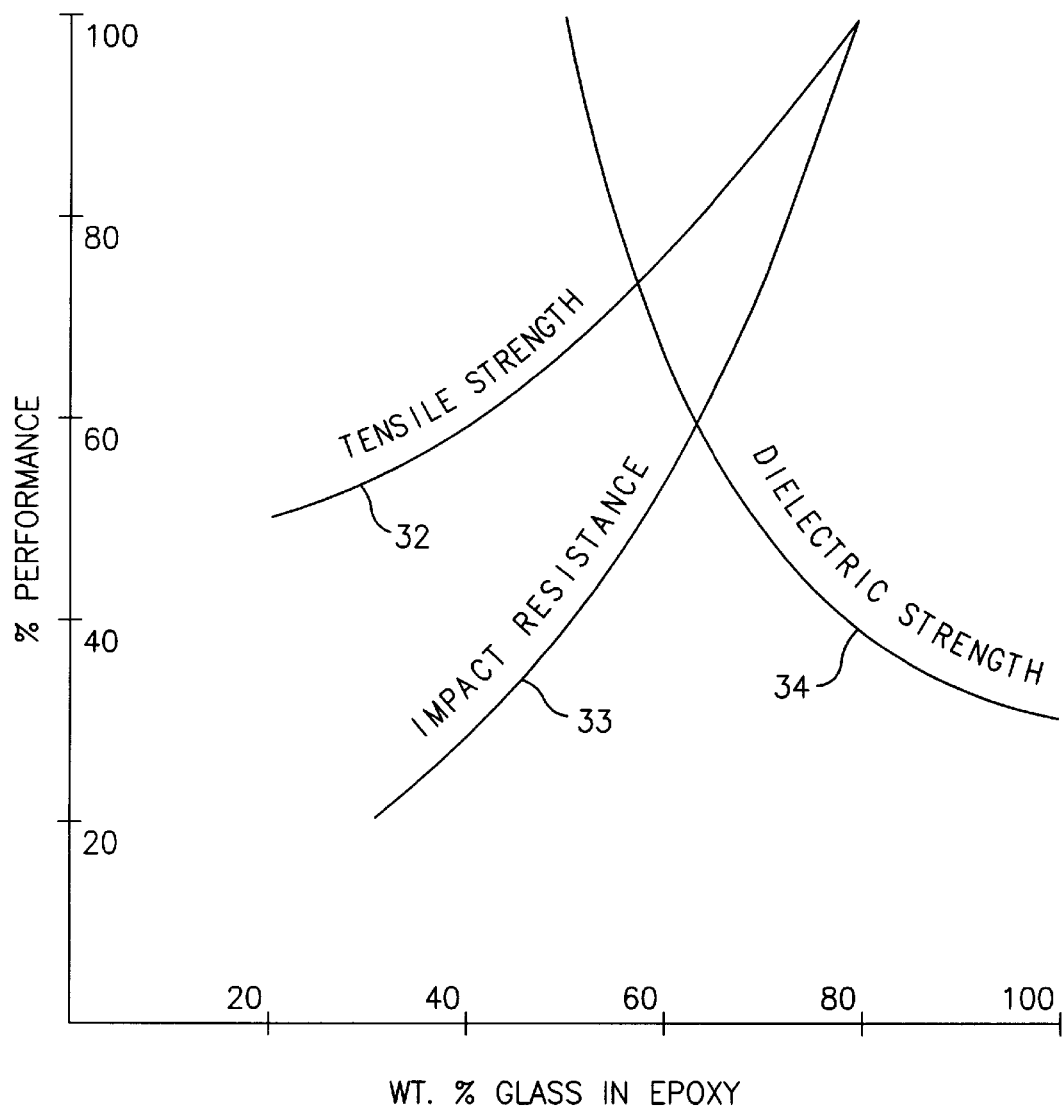
FIG. 4 is a graphic representation of the physical and electrical properties of the materials employed within the insulative plates of the busway joint of FIGS. 1–3.

The relationship between the glass fiber content in the epoxy composition and the measured properties of a fixed laminate thickness are depicted in FIG. 4. It is noted that the tensile strength 32 and impact resistance 33 increase in proportion to the amount of glass fibers whereas the dielectric strength 34 decreases therewith. An effective composition for maximum insulative plate performance in electrical busway joint performance within a high humidity environment is found within about 35 to about 75 weight percent glass.

An efficient electrical busway joint for maintaining electrical resistivity between the phases of a multi-phase electrical distribution system has been shown to include resistivity plates fabricated from a glass-filled epoxy composition. The electrical resistivity is sustained between the phases when subjected the electrical busway joint is subjected to high humidity testing.

What is claimed is:

1. An electric busway joint having a pair of outer support plates and a plurality of electrically-conductive plates intermediate said support plates and a plurality of electrically-insulative plates intermediate said electrically-conductive plates, wherein each electrically-insulative plate comprises a plurality of planar layers arranged to form a laminate of about 75–160 planar layers per inch, each planar layer comprising a glass-filled epoxy composition having between about 35 to 75 weight percent glass, wherein the glass is arranged as a plurality of glass fibers embedded within said epoxy composition.

* * * * *